United States Patent
Lin et al.

(10) Patent No.: US 10,234,831 B2
(45) Date of Patent: Mar. 19, 2019

(54) CONTROL COMMAND RESOLUTION ADJUSTMENT METHOD AND A COMMAND GENERATION DEVICE

(71) Applicant: TECO Electric & Machinery Co., Ltd., Taipei (TW)

(72) Inventors: Chia-Jen Lin, Taipei (TW); Feng-Chieh Lin, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 15 days.

(21) Appl. No.: 15/689,727

(22) Filed: Aug. 29, 2017

(65) Prior Publication Data
US 2018/0348710 A1    Dec. 6, 2018

(30) Foreign Application Priority Data

Jun. 3, 2017 (TW) .............................. 106118384 A

(51) Int. Cl.
G05B 13/02 (2006.01)

(52) U.S. Cl.
CPC ................... G05B 13/02 (2013.01)

(58) Field of Classification Search
CPC .................................................. G05B 13/02
USPC ................................................ 318/561, 560
See application file for complete search history.

(56) References Cited

U.S. PATENT DOCUMENTS 5,331,264 A * 7/1994 Cheng ............... G05B 19/416
318/560

* cited by examiner

*Primary Examiner* — David S Luo

(74) *Attorney, Agent, or Firm* — Muncy, Geissler, Olds & Lowe, P.C.

(57) ABSTRACT

A control command resolution adjustment method and a command generation device are disclosed in present invention. The control command resolution adjustment method is used to adjust a control command form the command generation device. A calculation frequency value via the command generation device is analyzed. The control command is received and a transform frequency value via the control command is analyzed. A first resolution value is calculated from the calculation frequency value and the transform frequency value. The first resolution value is distinguished greater than or equal to a minimum resolution value. When the first resolution value less than the minimum resolution value, an added calculation frequency value is calculated from the calculation frequency value and a frequency added value. A second resolution value is calculated from the added calculation frequency value and the transform frequency value. When the second resolution value greater than or equal to the minimum resolution value, the control command via the second resolution value is outputted.

8 Claims, 5 Drawing Sheets

CONTROL COMMAND RESOLUTION ADJUSTMENT METHOD AND A COMMAND GENERATION DEVICE

This application claims the benefit of Taiwan Patent Application Serial No. 106118384, filed Jun. 3, 2017, the subject matter of which is incorporated herein by reference.

BACKGROUND OF INVENTION

1. Field of the Invention

The present invention is related to a resolution adjustment method and a device thereof, and more particularly is related to a control command resolution adjustment method for changing a first resolution value to a second resolution value according to the determination of whether the first resolution value is greater than a minimum resolution value and a device thereof.

2. Description of the Prior Art

An electric motor is a device that converts electrical energy into mechanical energy. The motor industry began in 18th century since the first motor was created. The development of motor industry was growing after the industrial revolution, and till now in the age with rapid development in technological industries, people are asking for high-precision motors to meet the need of high-tech technologies.

In order to precisely control the rotation of electric motors, the resolution value of the control command should be adjusted to the minimum demand for controlling the rotation of electric motors. Firstly, the analyzing equipment is used to analyze the control command for the electric motor. The control command would be shown on the display module of the analyzing equipment as a waveform such that the users can use the analyzing method for a waveform to analyze the patterns on the display module. Then, the users may use the patterns on the display module to control a control device for adjusting the resolution value of the control command.

The users need to observe the waveforms on the display module manually to decide the amount to adjust the resolution value of the control command by the control device. Thus, it would be troublesome and tiring for the users, and may spend significant time to adjust the resolution value of the control signal during the whole resolution adjustment process.

SUMMARY OF THE INVENTION

In view of the conventional technology mentioned above, as the resolution value of the control command is adjusted manually, the users need to decide the amount to adjust the resolution value of the control command by the control device. It would be troublesome and tiring for the users, and may spend significant time to adjust the resolution value of the control signal during the whole resolution adjustment process.

Accordingly, it is a main object of the present invention to a control command resolution adjustment method. The control command resolution adjustment method is applied to a command generation device for adjusting a control command generated by the command generation device. Firstly, a minimum resolution value is generated. Then, the command generation device is analyzed to generate a calculation frequency value corresponding to the command generation device, and the control command is received and analyzed the control command to generate a varying frequency value corresponding to the control command.

Afterward, a first resolution value is generated according to the calculation frequency value and the varying frequency value. Then, a determination of whether the first resolution value is greater than or equal to the minimum resolution value or not is made. When the determination is no, an added calculation frequency value is then generated by adding a frequency added value to the calculation frequency value. Finally, a second resolution value is generated by using the added calculation frequency value and the varying frequency value, and the control command is outputted by using the second resolution value when the second resolution value is greater than or equal to the minimum resolution value.

In accordance with an embodiment of the control command resolution adjustment method of the present invention, when the first resolution value greater is determined to be greater than or equal to the minimum resolution value, the control command is outputted by using the first resolution value.

In accordance with an embodiment of the control command resolution adjustment method of the present invention, in the step of generating a first resolution value according to the calculation frequency value and the varying frequency value, a divider is used to divide the calculation frequency value by the varying frequency value to generate the first resolution value.

In accordance with an embodiment of the control command resolution adjustment method of the present invention, the control command is a sine wave or a square wave.

In accordance with an embodiment of the control command resolution adjustment method of the present invention, in the step of generating a second resolution value by using the added calculation frequency value and the varying frequency value, a divider is used to divide the added calculation frequency value by the varying frequency value to generate the second resolution value.

A command generation device is also provided in the present invention. The command generation device comprises a command generation module, a calculation module, and a determination module. The command generation module is utilized for generating a control command. The calculation module is electrically connected to the command generation module. The calculation module is utilized for analyzing the command generation device to generate a calculation frequency value corresponding to the command generation device, receiving and analyzing the control command to generate a varying frequency value corresponding to the control command, and generating a first resolution value according to the calculation frequency value and the varying frequency value. The determination module is electrically connected to the calculation module and set with a minimum resolution value. The determination module is utilized for receiving the first resolution value and determining whether the first resolution value is greater than or equal to the minimum resolution value or not, and sending a determination signal to the calculation module when the determination is no.

Wherein, when the calculation module receives the determination signal, the calculation module triggers the command generation module to generate an added calculation frequency value by adding a frequency added value to the calculation frequency value, generates and transmits a second resolution value by using the added calculation frequency value and the varying frequency value, and triggers the command generation module to output the control command by using the second resolution value when the determination module determines that the second resolution value is greater than or equal to the minimum resolution value.

In accordance with an embodiment of the command generation device of the present invention, the control command is a sine wave or a square wave.

In accordance with an embodiment of the command generation device of the present invention, the calculation module comprises at least one selected from the group composed of a divider and a multiplier.

As mentioned, in accordance with the control command resolution adjustment method and the command generation device thereof provided in accordance with the present invention, the first resolution value of the control command is calculated according to the calculation frequency value and the varying frequency value, and the determination of whether the first resolution value is greater than or equal to the minimum resolution value is made. When the first resolution value is greater than or equal to the minimum resolution value, the control command would be outputted.

When the first resolution value is less than the minimum resolution value, the frequency added value would be added to the calculation frequency value to generate the added calculation frequency value, and the second resolution value is calculated according to the added calculation frequency value and the varying frequency value. Finally, the determination of whether the second resolution value is greater than or equal to the minimum resolution value is made, and the control command would be outputted when the second resolution value is greater than or equal to the minimum resolution value.

In compared with the conventional technology, the control command resolution adjustment method and the command generation device provided in accordance with the present invention are capable to adjust the resolution value of the control command automatically by using the command generation module, the calculation module and the determination module of the command generation device. Therefore, the conventional manually operation can be prevented so as to reduce the loading for the users during the resolution adjustment process as well as the time cost of the resolution adjustment process.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
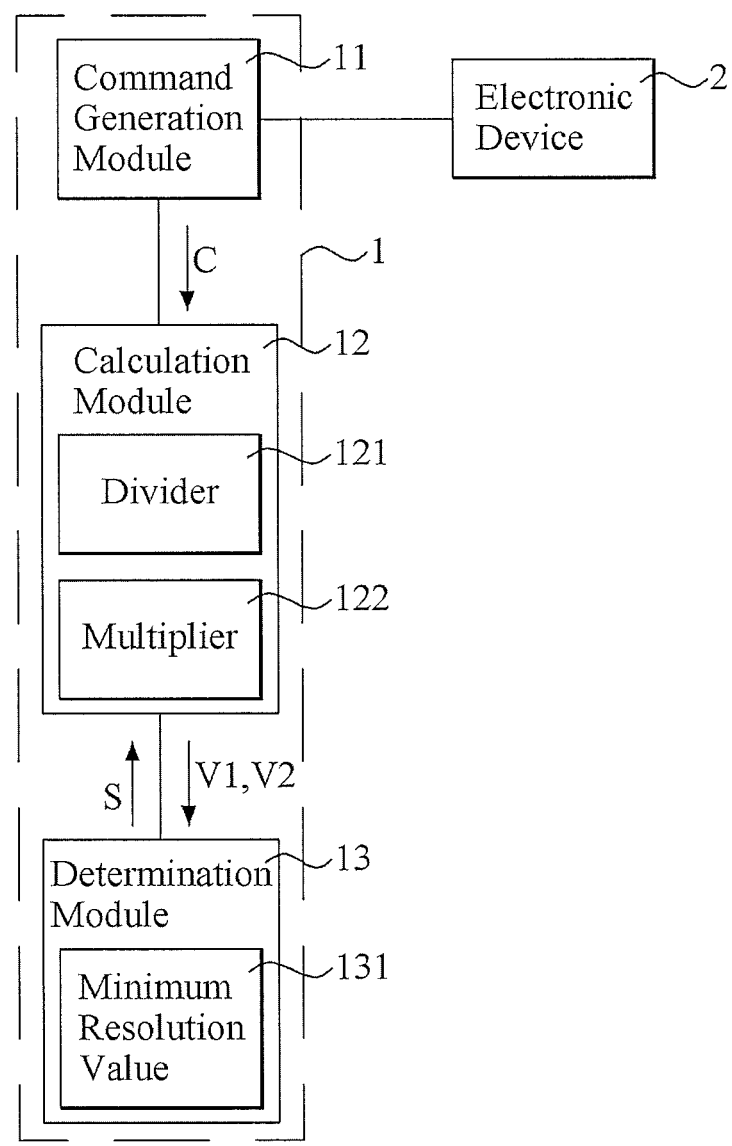
FIG. 1 is a block diagram of the command generation device provided in accordance with a preferred embodiment of the present invention.

Please refer to FIG. 1, which is a block diagram of the command generation device provided in accordance with a preferred embodiment of the present invention. As shown, the command generation device 1 provided in accordance with the preferred embodiment of the present invention includes a command generation module 11, a calculation module 12, and a determination module 13. In the present embodiment, the command generation device 1 is a field programmable gate array (FPGA), but the present invention is not limited thereto.

The command generation module 11 is electrically connected to an electronic device 2. The electronic device 2 can be a servo driver or a servo motor, but the present invention is not limited thereto. The calculation module 12 is electrically connected to the command generation module 11 and includes a divider 12 and a multiplier 122. The calculation module 12 can be a hardware, e.g. a processor, or a software, e.g. a computing program. The processor can be the central processing unit (CPU) or a microprocessor, and the computing program can be implemented by the programming language such as ASP, C/C++/C#, JAVA, Python, PHP, Perl, but the present invention is not limited thereto.

The determination module 13 is electrically connected to the calculation module 12 and is set with a minimum resolution value 131. The determination module 13 can be a central processing unit, a microprocessor, or a software program, and the software program can be implemented by the programming language such as ASP, C/C++/C#, JAVA, Python, PHP, Perl, but the present invention is not limited thereto.

Figure 2A:
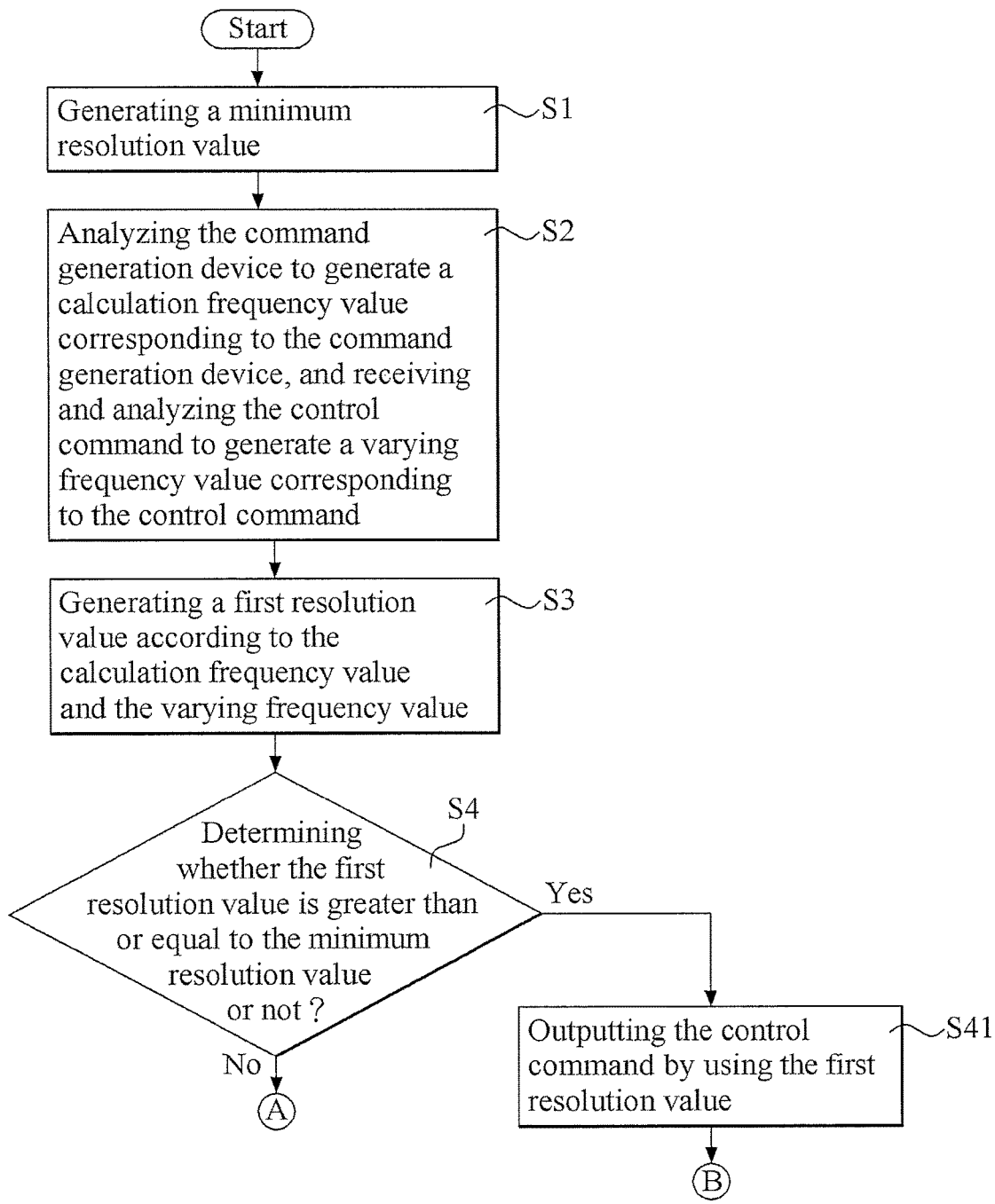
FIG. 2A and FIG. 2B are flow charts showing the control command resolution adjustment method provided in accordance with a preferred embodiment of the present invention.
Figure 2B:
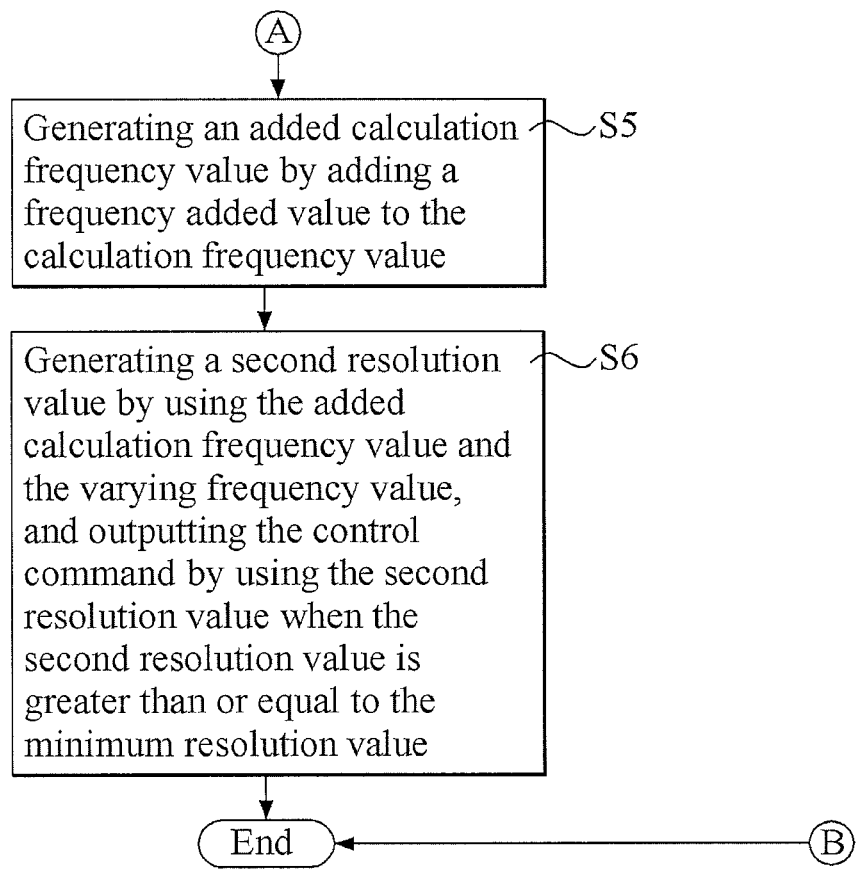
Figure 3:
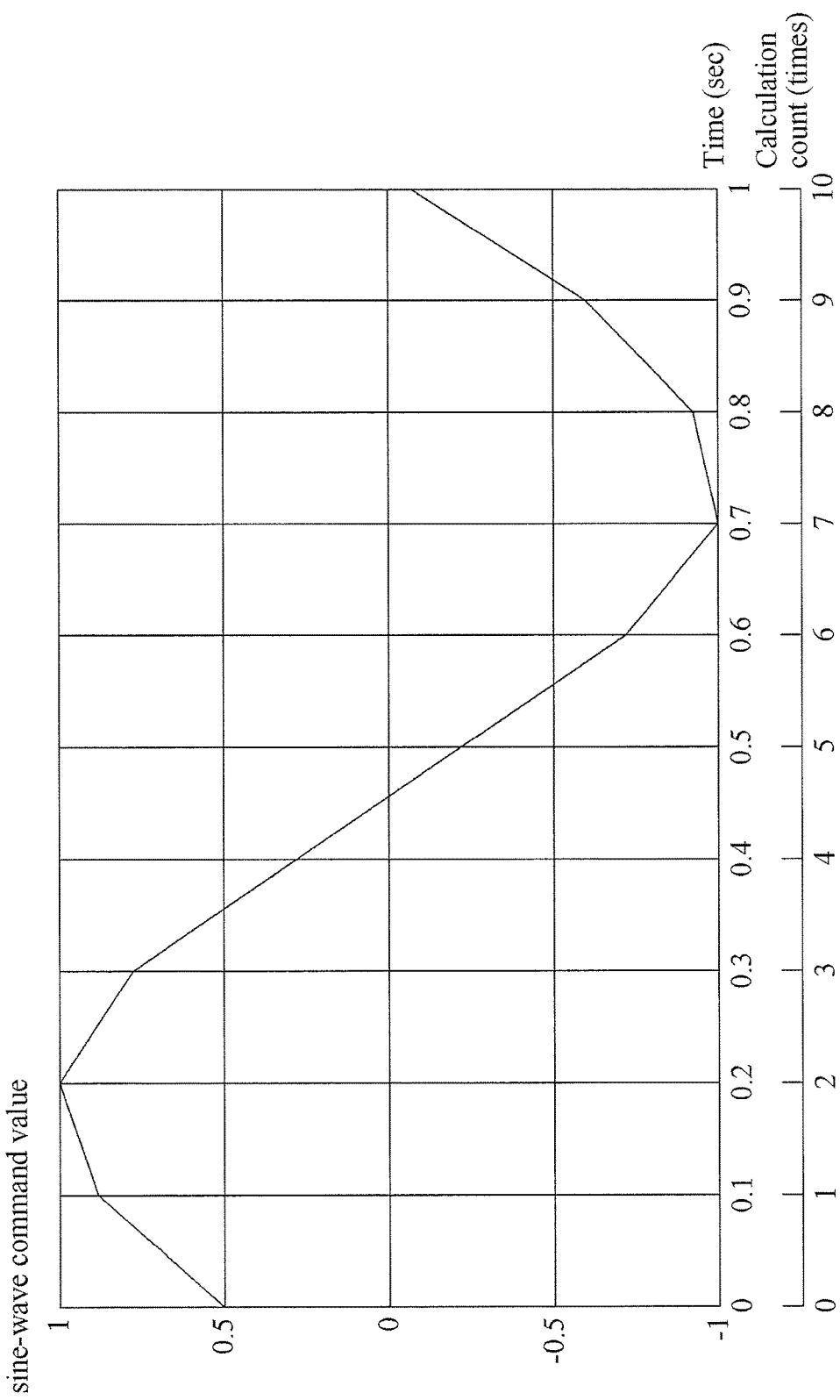
FIG. 3 is a diagram showing the waveform of the control command with the first resolution value in accordance with a preferred embodiment of the present invention.

Please refer to FIG. 1 to FIG. 3, wherein FIG. 2A and FIG. 2B are flow charts showing the control command resolution adjustment method provided in accordance with a preferred embodiment of the present invention, and FIG. 3 is a diagram showing the waveform of the control command with the first resolution value in accordance with a preferred embodiment of the present invention. As shown, the control command resolution adjustment method provided in accordance with a preferred embodiment of the present invention is applied to the command generation device 1 for adjusting a control command C generated by the command generation module 11 of the command generation device 1. The control command C can be a sine wave or a square wave, but the present invention is not limited thereto. In the beginning, a minimum resolution value 131 is created in the determination module 13 (i.e. step S1). In the present embodiment, the minimum resolution value 131 is 95, but the present invention is not limited thereto.

Then, the calculation module 12 is used to analyze the command generation device 1 to generate a calculation frequency value corresponding to the command generation device 1, and also receive and analyze the control command C to generate a varying frequency value corresponding to the control command C (i.e. step S2). In the present embodiment, the control command C is a sine wave, and the sine value of the control signal C is defined as sine-wave command value. In the present embodiment, the calculation frequency value is 10 times per second, but the present invention is not limited thereto. In addition, in the present embodiment, the varying frequency value is 1 time per second, but the present invention is not limited thereto. That is, the changing period of the control signal C is 1 second, i.e. the sine-wave command value would be changed from the start point to 1, down to −1, and finally back to 0 in one second. Because the calculation frequency value is 10 times per second, the sine-wave command value of the control command C is calculated every 0.1 second.

Then, the calculation module 12 generates a first resolution value V1 according to the calculation frequency value and the varying frequency value (i.e. step S3). In accordance with a preferred embodiment, the divider 121 is used to divide the calculation frequency value by the varying frequency value to generate the first resolution value V1. In the present embodiment, the first resolution value V1 is 10, but the present invention is not limited thereto. Thereafter, the determination module 13 receives the first resolution value V1 and determines whether the first resolution value V1 is greater than or equal to the minimum resolution value or not (i.e. step S4). In the determination result is yes, the determination module 13 may trigger the command generation module 11 to output the control command C according to the first resolution value V1 to the electronic device 2.

Figure 4:
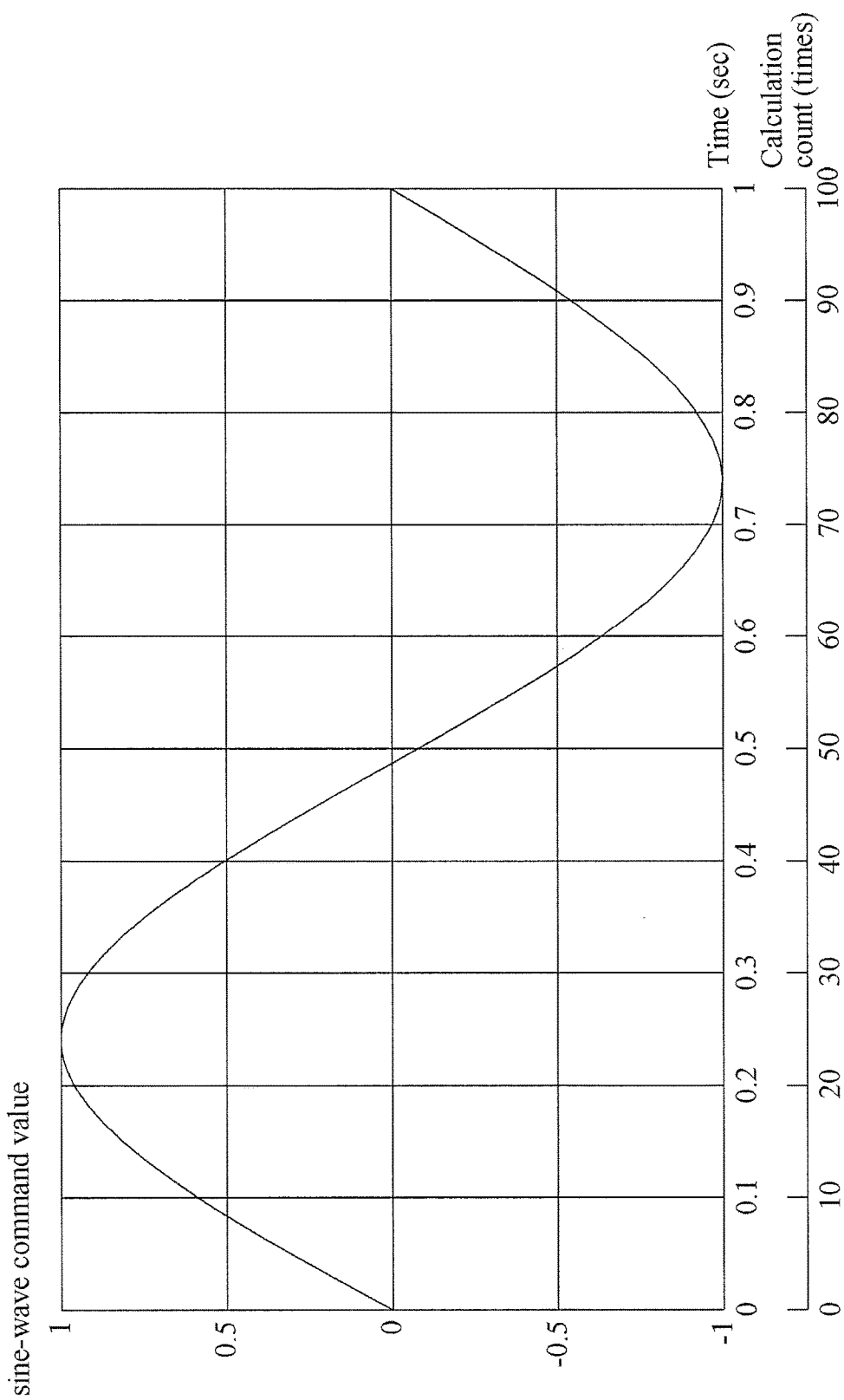
FIG. 4 is a diagram showing the waveform of the control command with the second resolution value in accordance with a preferred embodiment of the present invention.

Please refer to FIGS. 1, 2A, 2B, and 4, wherein FIG. 4 is a diagram showing the waveform of the control command with the second resolution value in accordance with a preferred embodiment of the present invention. As shown, when the determination result is no, the determination module 13 may transmit a determination signal S to the calculation module 12 to have the calculation module add a frequency added value to the calculation frequency value to generate an added calculation frequency value (i.e. step S5). In the present embodiment, the frequency added value is 90, but the present invention is not limited thereto.

In the present embodiment, the first resolution value V1 is 10, the minimum resolution value 131 is set as 95, and thus the first resolution value V1 is less than the minimum resolution value 131. As a supplement to the previous description, it is noted that the waveform of the control command C shown in FIG. 3 has a longer broken line to show an unsmooth contour. This is because the first resolution value V1 is too small. Therefore, the calculation module 12 comes out with the added calculation frequency value of 100.

Finally, the calculation module 12 generates a second resolution value V2 by using the added calculation frequency value and the varying frequency value, such that when the second resolution value V2 is greater than or equal to the minimum resolution value 131, the calculation module 12 may trigger the command generation module 11 to output the control command C according to the second resolution value V2 (i.e. step S6). In accordance with a preferred embodiment, the divider 121 is used to divide the added calculation frequency value by the varying frequency value to generate the second resolution value V2.

In the present embodiment, the second resolution value V2 generated by the divider 121 is 100, and thus the second resolution value V2 is greater than the minimum resolution value 131. As a supplement to the previous description, it is noted that the waveform of the control command C shown in FIG. 4 is apparently smoother. This is because the second resolution value V2 is greater. Therefore, the command generation module 11 would be triggered to output the control signal C according to the second resolution value V2 to the electronic device 2.

In conclusion, in accordance with the control command resolution adjustment method and the command generation device thereof provided in accordance with the present invention, the calculation module is used to calculate the first resolution value of the control command generated by the command generation module, and then the determination module is used to determine whether the first resolution value is greater than or equal to the minimum resolution value. When the first resolution value is greater than or equal to the minimum resolution value, the control command with the first resolution value would be outputted to the electronic device.

When the first resolution value is less than the minimum resolution value, the frequency added value would be added to the calculation frequency value to generate the added calculation frequency value. Then, the calculation module is used to calculate the second resolution value according to the added calculation frequency value and the varying frequency value. Finally, the determination module determinates whether the second resolution value is greater than or equal to the minimum resolution value or not, and the control command with the second resolution value would be outputted to the electronic device when the second resolution value is greater than or equal to the minimum resolution value.

In compared with the conventional technology, the control command resolution adjustment method and the command generation to device provided in accordance with the present invention are capable to adjust the resolution value of the control command automatically by using command generation module, the calculation module and the determination module, such that the first resolution value less than the minimum resolution value would be adjusted to the second resolution value and the control command with the second resolution value would be then transmitted to the electronic device.

Thereby, the control command resolution adjustment method and the command generation device provided in accordance with the present invention are capable to adjust the resolution value of the control command automatically without the need of manual labor to observe the waveforms on the display module and do the adjustment. Thus, the loading for the users and the time cost of the resolution adjustment process can be reduced.

While the present invention has been particularly shown and described with reference to a preferred embodiment, it will be understood by those skilled in the art that various changes in form and detail may be without departing from the spirit and scope of the present invention.

What is claimed is:

1. A control command resolution adjustment method, applied to a command generation device for adjusting a control command generated by the command generation device, the control command resolution adjustment method comprising the steps of:
   (a) generating a minimum resolution value;
   (b) analyzing the command generation device to generate a calculation frequency value corresponding to the command generation device, and receiving and analyzing the control command to generate a varying frequency value corresponding to the control command;
   (c) generating a first resolution value according to the calculation frequency value and the varying frequency value;
   (d) determining whether the first resolution value is greater than or equal to the minimum resolution value or not;
   (e) when the determination of step (d) is no, generating an added calculation frequency value by adding a frequency added value to the calculation frequency value; and
   (f) generating a second resolution value by using the added calculation frequency value and the varying frequency value, and outputting the control command by using the second resolution value when the second resolution value is greater than or equal to the minimum resolution value.

2. The control command resolution adjustment method of claim 1, wherein, when the determination of step (d) is yes, output the control command by using the first resolution value.

3. The control command resolution adjustment method of claim 1, wherein the control command is a sine wave or a square wave.

4. The control command resolution adjustment method of claim 1, wherein in step (c), a divider is used to divide the calculation frequency value by the varying frequency value to generate the first resolution value.

5. The control command resolution adjustment method of claim 1, wherein in step (f), a divider is used to divide the added calculation frequency value by the varying frequency value to generate the second resolution value.

6. A command generation device, comprising:
a command generation module, utilized for generating a control command;
a calculation module, electrically connected to the command generation module, for analyzing the command generation device to generate a calculation frequency value corresponding to the command generation device, receiving and analyzing the control command to generate a varying frequency value corresponding to the control command, and generating a first resolution value according to the calculation frequency value and the varying frequency value; and
a determination module, electrically connected to the calculation module and set with a minimum resolution value, utilized for receiving the first resolution value and determining whether the first resolution value is greater than or equal to the minimum resolution value or not, and sending a determination signal to the calculation module when the determination is no;
wherein, when the calculation module receives the determination signal, the calculation module triggers the command generation module to generate an added calculation frequency value by adding a frequency added value to the calculation frequency value, generates and transmits a second resolution value by using the added calculation frequency value and the varying frequency value, and triggers the command generation module to output the control command by using the second resolution value when the determination module determines that the second resolution value is greater than or equal to the minimum resolution value.

7. The control generation device of claim 6, wherein the control command is a sine wave or a square wave.

8. The control generation device of claim 6, wherein the calculation module comprises at least one selected from the group composed of a divider and a multiplier.

* * * * *